H. AST.
CLUTCH.
APPLICATION FILED JUNE 15, 1906.
899,822.
Patented Sept. 29, 1908.
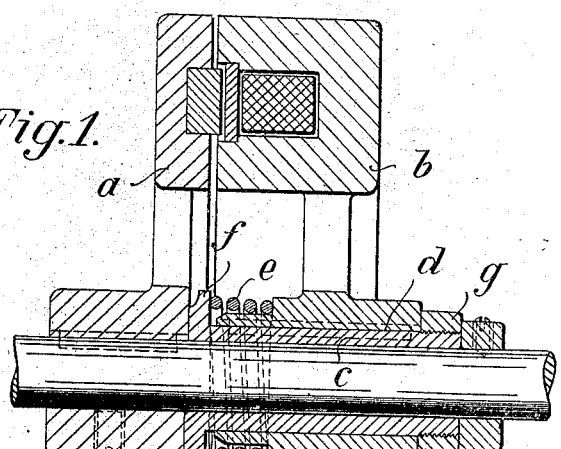
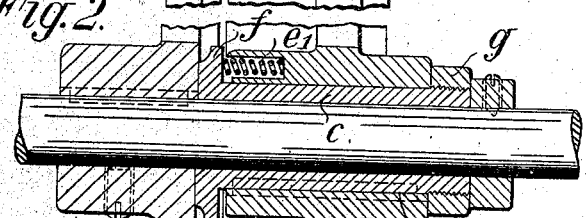
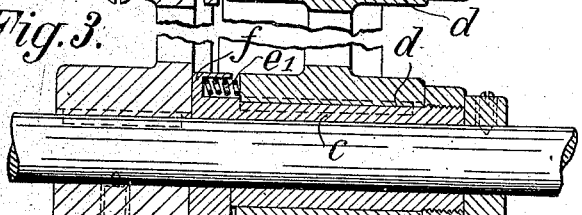
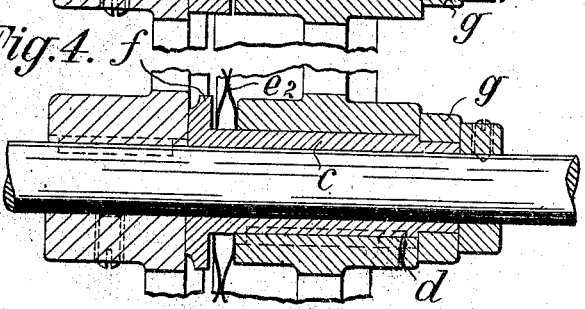
Witnesses
Sally O. Yudizky.
G W Eisenbamy
Heinrich Ast Inventor.
By his Attorney Redk A Schuck

UNITED STATES PATENT OFFICE.

HEINRICH AST, OF VIENNA, AUSTRIA-HUNGARY, ASSIGNOR TO THE FIRM OF VULKAN MASCHINENFABRIKS-ACTIEN-GESELLSCHAFT, OF VIENNA, AUSTRIA-HUNGARY.

CLUTCH.

No. 899,822.  Specification of Letters Patent.  Patented Sept. 29, 1908.

Application filed June 15, 1906. Serial No. 321,868.

*To all whom it may concern:*

Be it known that I, HEINRICH AST, subject of the Emperor of Austria-Hungary, residing at Vienna, Austria-Hungary, have invented certain new and useful Improvements in Clutches, of which the following is a specification.

The object of the present invention is to produce a clutch provided with means adapted to keep the two parts of the clutch, (which parts *e. g.*, in electro-magnetic clutches are attracted towards each other and are mounted upon the same shaft) apart in such a way that, when the clutch is thrown out of operation, the part of the clutch which runs idle is prevented from jamming sidewise without any axial pressure producing friction being caused, so that the frictional surfaces are protected from wear, the part of the clutch thrown out of operation is prevented from being automatically carried along, and in electro-magnetic clutches the residual magnetism is thereby caused to disappear more quickly. The mechanism hitherto employed for this purpose by no means fulfils these requirements efficiently because, when the one part of the clutch is stationary, the springs employed, and which are mounted in recesses in one part of the clutch and press directly or by means of separate bearing pieces upon faces of the other part of the clutch, are moved relatively to the stationary part by the rotation of the other part. In this way the pressure surfaces are ground away, distortion of the springs and in consequence thereof automatic carrying along of the driven part readily occurs; this disadvantage is present even when a common bearing ring is employed for the springs, which ring is secured against twisting on the part of the clutch which carries the springs. Apart from the injurious frictional losses the certainty of the clutch working is also greatly reduced thereby.

In a clutch according to this invention the means provided for the purpose obviate these disadvantages. Such means consist substantially in the provision of a running sleeve for the one part of the clutch, such sleeve being longer than the hub of this clutch part and being so connected therewith that movement of the clutch part on the running sleeve by the spring force which comes into action, when the clutch is thrown out of operation, can take place but no twisting. In consequence of this construction there results complete regularity of the spring pressure and the loosely running part of the clutch can move with the running sleeve without any friction on the other keyed or fast part of the clutch and consequently without influencing the latter.

In the accompanying drawings which show special constructional forms of such improved clutch, Figure 1, illustrates the separating means as a helical spring arranged concentrically about a loose sleeve; Figs. 2 and 3, several helical springs arranged around the sleeve; and Fig. 4, blade springs arranged upon said sleeve.

In all the figures of such drawing $a$ indicates the clutch part which is fast or keyed, $b$ the loosely running part of the clutch, and $c$ the running sleeve, which is so connected with the hub of the part $b$ of the clutch, as by a feather and groove $d$ or in any other suitable way, that the part $b$ of the clutch can execute an axial movement but cannot twist or move relatively in an angular direction upon the running sleeve $c$.

The running sleeve $c$ is provided with a collar $f$ and, in the construction shown in Fig. 1, a helical spring $e$ is arranged concentrically around the sleeve bearing on the one hand against the collar $f$ of the sleeve and on the other hand against the hub of the movable part $b$ of the clutch. In the position occupied by the clutch part $b$ when the clutch is thrown out of operation the spring pressure is received by a ring $g$ connected with the sleeve $c$ and forming a second collar thereon.

Figs. 2 and 3 show constructional forms in which, instead of one concentrically mounted helical spring $e$ several smaller springs $e^1$ are arranged around the sleeve $c$ and are carried in recesses formed in the hub of the clutch part $b$ (Fig. 2) or in the collar $f$ of the sleeve (Fig. 3).

As shown in Fig. 4, blade springs $e^2$ may be arranged upon the running sleeve $c$ between the collar $f$ and the hub for the same purpose.

Claims.

1. In electro-magnetic clutches: a shaft; a clutch member fixed thereon; a loose clutch member; a running sleeve free to turn upon said shaft and of greater length than said loose clutch member, and connected thereto in such a manner as to allow the latter only longitudinal motion with respect to the former; a collar on said running sleeve; and means exerting a yielding pressure between said collar and said loose clutch member.

2. In electro-magnetic clutches: a shaft; a clutch member fixed thereon; a loose clutch member; a running sleeve free to turn upon said shaft and of greater length than said loose clutch member, and connected thereto in such a manner as to allow the latter only longitudinal motion with respect to the former; a collar on said running sleeve; means exerting a yielding pressure between said collar and said loose clutch member; and a second collar on said running sleeve against which said loose clutch member abuts in its terminal position.

3. In electro-magnetic clutches: a shaft; a clutch member fixed thereon; a loose clutch member; a running sleeve free to turn upon said shaft and of greater length than said loose clutch member, and connected thereto in such a manner as to allow the latter only longitudinal motion with respect to the former; a collar on said running sleeve; and a pressure spring or springs between said collar and the hub of said loose clutch member.

4. In electro-magnetic clutches: a shaft; a clutch member fixed thereon; a loose clutch member; a running sleeve free to turn upon said shaft and of greater length than said loose clutch member, and connected thereto in such a manner as to allow the latter only longitudinal motion with respect to the former; a collar on said running sleeve; and a pressure spring arranged concentrically about the running sleeve between the said collar and the hub of said loose clutch member.

In testimony whereof I have hereunto set my hand in presence of two subscribing witnesses.

HEINRICH AST.

Witnesses:
JOSEF RUBARCK,
ALVESTO S. HOGUE.